United States Patent [19]

Ueda

[11] Patent Number: 5,548,373
[45] Date of Patent: Aug. 20, 1996

[54] IMAGE READING APPARATUS

[75] Inventor: Toshihiko Ueda, Toyokawa, Japan

[73] Assignee: Minolta Camera Kabushiki Kaisha, Osaka, Japan

[21] Appl. No.: 180,204

[22] Filed: Jan. 11, 1994

[30]  Foreign Application Priority Data

Jan. 12, 1993 [JP] Japan .................................. 5-003610

[51] Int. Cl.$^6$ ............................................ G03B 27/52
[52] U.S. Cl. ................................ 355/55; 355/67; 359/679
[58] Field of Search ................................ 355/67, 55, 71; 359/708, 742, 679

[56]  References Cited

U.S. PATENT DOCUMENTS

| | | | |
|---|---|---|---|
| 4,586,814 | 5/1986 | Tokuhara et al. | 359/679 X |
| 4,812,021 | 3/1989 | Harrigan | 359/679 |
| 4,907,865 | 3/1990 | Ichiki et al. | 359/679 |
| 5,046,838 | 9/1991 | Iwasaki | 359/742 X |
| 5,078,487 | 1/1992 | Toyono et al. | 355/55 X |
| 5,162,844 | 11/1992 | Ueda | 355/67 |

FOREIGN PATENT DOCUMENTS

63-56635  3/1988  Japan .

*Primary Examiner*—Nestor R. Ramirez
*Attorney, Agent, or Firm*—Price, Gess & Ubell

[57]  ABSTRACT

An image reading apparatus which does not require lens replacement and which satisfies the requirements of Köhler illumination regardless of changes in projection magnification. The image reading apparatus comprising an image reading device having a predetermined length in the main scanning direction for transforming an optical image projected thereon into analog image signals, a light source, condenser elements having an aspherical effect in the main scanning direction, thereby satisfying the requirements for Köhler illumination, and projection lens for projecting an image of an original illuminated by the light source onto the image reading device. A motor can move the projection lens and its pupil along the optical axis.

23 Claims, 6 Drawing Sheets

IMAGE READING APPARATUS

BACKGROUND OF THE INVENTION

1. Field of the Invention

The present invention relates to an image reading apparatus, and more specifically relates to an image reading apparatus for reading images recorded on light-transmitting film by means of a linear sensor array.

2. Description of the Related Art

Conventional image reading apparatus using a linear sensor array comprising a plurality of reading elements disposed in a single row typically illuminate a film by means of light emitted from a light source unit, and irradiate a linear sensor array via a projection lens by means of the light transmitted through said film. A single image of the film is read by moving the film at a predetermined speed in a subscanning direction which is perpendicular to a main scanning direction which is the direction of the array of aligned reading elements. A Köhler illumination system capable of illuminating a film of broad area regardless of the shape and size of the light source may be used as the aforesaid illumination system.

There are a plurality of film sizes including 4×5 inch format, Brownie format, 35 mm format and the like. Whatever the film size, in order to read an image at high resolution, the projection magnification must be changed in accordance with said film size, such that an image is typically displayed in the entire main scanning direction of the linear sensor array. In a conventional image reading apparatus, the aforesaid change of the projection magnification is accomplished by a method wherein the lens is replaced by another lens having a different focal length, or a method wherein the focal length of a zoom lens is changed while said lens is stationary at a predetermined position.

Methods for changing projection magnification in conventional apparatus can satisfy the requirements of Köhler illumination without moving the illumination unit because the lens pupil movement is quite small. In the case of the lens replacement method the disadvantage is that the lens must be replaced for each film size, and when a zoom lens is used, the disadvantage is that the number of lenses increases and the lens diameter increases, thereby greatly enlarging the lens system.

In conventional image reading apparatus, the image scan in the subscanning direction is accomplished by moving the film. However, methods for moving the film require that the film loading device is exposed outside the apparatus to facilitate the film replacement operation, and there is some danger that the hand of an operator may inadvertently come into contact with the moving portion.

SUMMARY OF THE INVENTION

A main object of the present invention is to provide an improved image reading apparatus capable of eliminating the previously described disadvantages.

A further object of the present invention is to provide a compact image reading apparatus which does not require lens replacement and which satisfies the requirements of Köhler illumination regardless of changes in projection magnification.

A still further object of the present invention is to provide an image reading apparatus which satisfies the requirements of Köhler illumination without moving the illumination unit regardless of the movement of the lens pupil.

An even further object of the present invention is to provide an image reading apparatus which permits easy operation by an operator with a high degree of safety.

The aforesaid objects of the invention are achieved by providing an image reading apparatus comprising image reading means having a plurality of reading elements arrayed in the main scanning direction, illumination means including a light source and condenser elements having power characteristics such that the point of convergence recedes in accordance with the separation of the light rays from an optical axis, projection means for projecting a film image illuminated by said illumination means on said reading means and drive means for moving the pupil of said projection means on an optical axis.

The aforesaid objects of the present invention are further achieved by providing an image reading apparatus comprising image reading means having a plurality of reading elements arrayed in the main scanning direction, illumination means including a light source and condenser elements having power in the main scanning direction, projection means for projecting a film image illuminated by said illumination means on said reading means, drive means for moving the pupil of said projection means on an optical axis and drive means for moving at least one among said illumination means, projection means, and image reading means so as to scan said image in the subscanning direction.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1A:
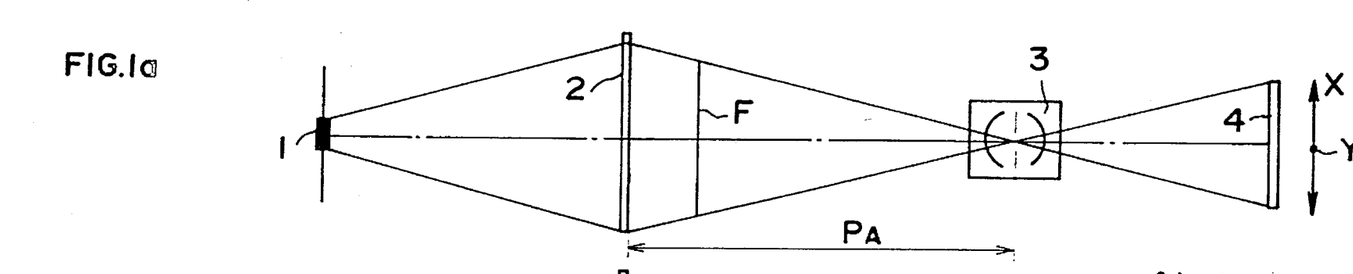
FIG. 1a is a top view briefly showing the image reading apparatus of a first embodiment of the invention showing the projection lens position relative to a 4×5 inch format.
Figure 1B:
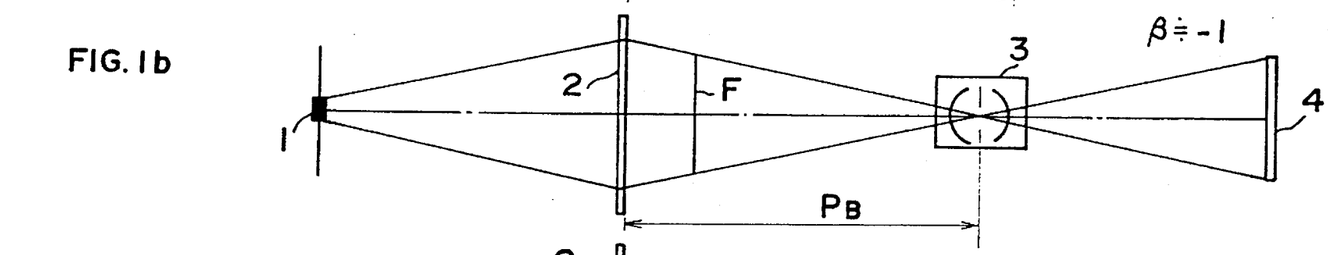
FIG. 1b is a top view briefly showing the image reading apparatus of a first embodiment of the invention showing the projection lens position relative to a Brownie format.
Figure 1C:
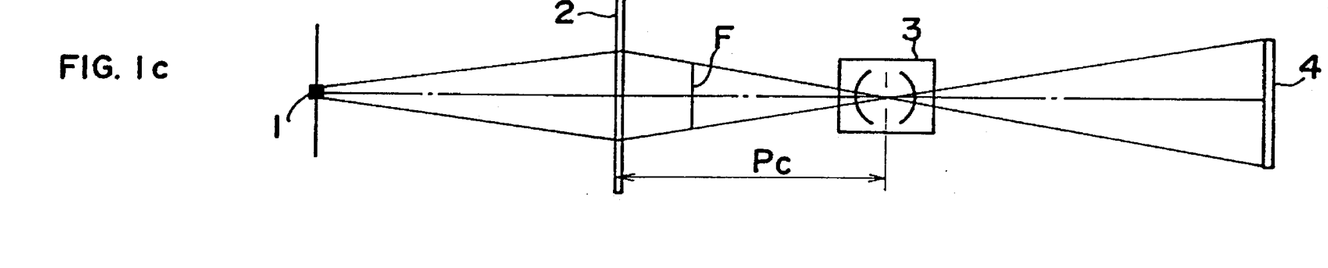
FIG. 1c is a top view briefly showing the image reading apparatus of a first embodiment of the invention showing the projection lens position relative to a 35 mm format.

FIGS. 1a, 1b and 1c show a first embodiment of the image reading apparatus of the present invention. In the drawings, reference numeral 1 refers to a filament used as a light source; reference numeral 2 refers to an aspherical convergence element; reference numeral 3 refers to a projection lens; reference numeral 4 refers to a linear charge-coupled device (CCD); and the reference symbol F refers to a film upon which an image is recorded. The film F may be one of three types and sizes shown in FIGS. 1a, 1c and 1c, and is disposed medially to the convergence element 2 and the projection lens 3. The projection lens 3 is supported by a frame of the image reading apparatus and moved by a motor along the optical axis. Three types of films used in the apparatus of the present embodiment are 35 mm, Brownie, and 4×5 inch formats. The linear CCD 4 comprises a plurality of elements linearly arrayed in the main scan direction X for transforming an optical image projected thereon into analog image signals. The convergence element 2 is powered in the main scanning direction, and has an aspherical surface effect which converges the luminous flux emitted from the filament 1 at the pupil of the projection lens 3.

The light emitted from the filament 1 is converged on the pupil of the projection lens 3 by means of the convergence element 2, and at the same time, the image of the film F is formed on the linear CCD 4. The image of one sheet of the film F is read by scanning in the subscanning direction Y which is perpendicular to the main scanning direction X. The image is read one line at a time by the linear CCD 4 and is transmitted to a well known image processing control section not shown in the illustrations.

The scan of the aforesaid image in the subscanning direction Y is accomplished by moving the filament 1, convergence element 2 and linear CCD 4 simultaneously in the subscanning direction Y. This movement is accomplished by precisely controlling a motor not shown in the drawings using a pulse control method. The scan of the aforesaid image in the subscanning direction Y may also be accomplished by moving the filament 1, convergence element 2 and projection lens 3 simultaneously in the subscanning direction Y.

When the images on films of difference sizes are read by the linear CCD 4, said linear CCD 4 uses all the aforesaid plurality of image elements it possesses regardless of the size of the film so that said film images can be read at high resolution. Therefore, the projection magnification may be changed via the projection lens 3. In the first embodiment, the projection magnification is changed by means of a method wherein the conjugate distance from the film F to the linear CCD 4 is changed and the distance from the convergent element 2 to the projection lens 3 is changed to PA, PB, PC. According to this method, the pupil of the projection lens 3 is moved on the optical axis in conjunction with the movement of the lens 3.

When the positions of the filament 1 and the convergence element 2 of the illumination unit is stationary at a fixed position on the optical axis, the converging distance of the light flux from the convergence element 2 must be changed to PA, PB, and PC in accordance with the movement of the pupil of the projection lens 3 on the optical axis. This change in converging distance is to equalize the incident light distribution normally entering the linear CCD 4 in the main scanning direction X, particularly in view of the necessity of suitably converging the light flux at both ends of the film F in the main scanning direction X. In the present embodiment, the aforesaid light distribution can be equalized by providing an aspherical effect via the power of the convergence element 2 in the main scanning direction, thereby satisfying the requirements for Köhler illumination. Furthermore, light distribution can be equalized by providing a line light source along the main scanning direction rather than a spot light source.

Figure 2:
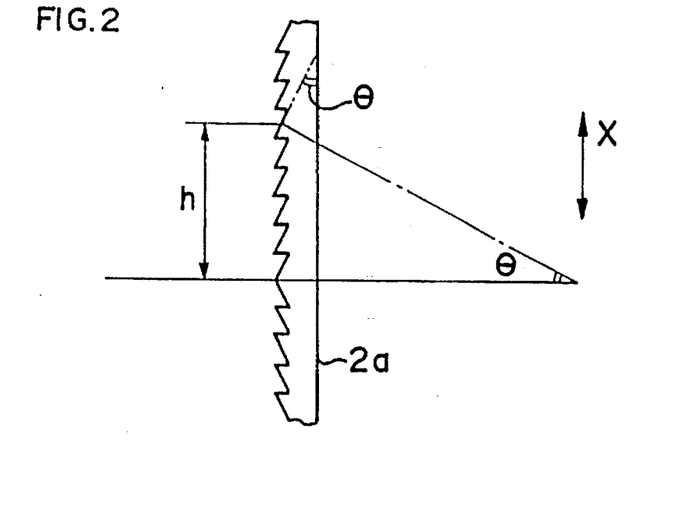
FIG. 2 is an illustration showing the convergence characteristics of the linear Fresnel lens.
Figure 3:
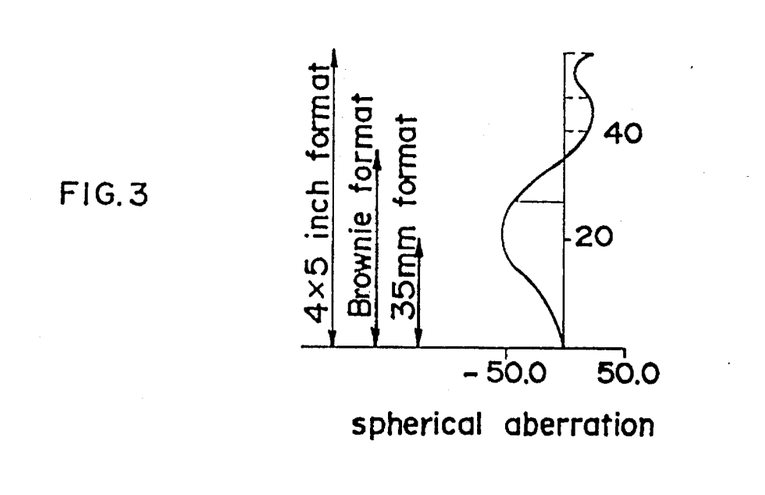
FIG. 3 is a characteristics chart showing the spherical aberration of the Fresnel lens.

A linear Fresnel lens may be used as the convergence element 2. The linear Fresnel lens 2a is a cylindrical lens made of resin with a reduced thickness, as shown in FIG. 2. The spherical aberration of the linear Fresnel lens 2a in the main scanning direction X is in the positive direction when the light source (filament 1) is the object point, i.e., the lens has the characteristic of a receding convergence point in accordance with the separation of the light rays from the optical axis, as shown in FIG. 3. Thus, when the angle of inclination $\theta$ of each linear Fresnel lens is separated a distance h from the optical axis, the following relationship obtains.

$r = h / \cos \theta_{ps}$

Figure 4:
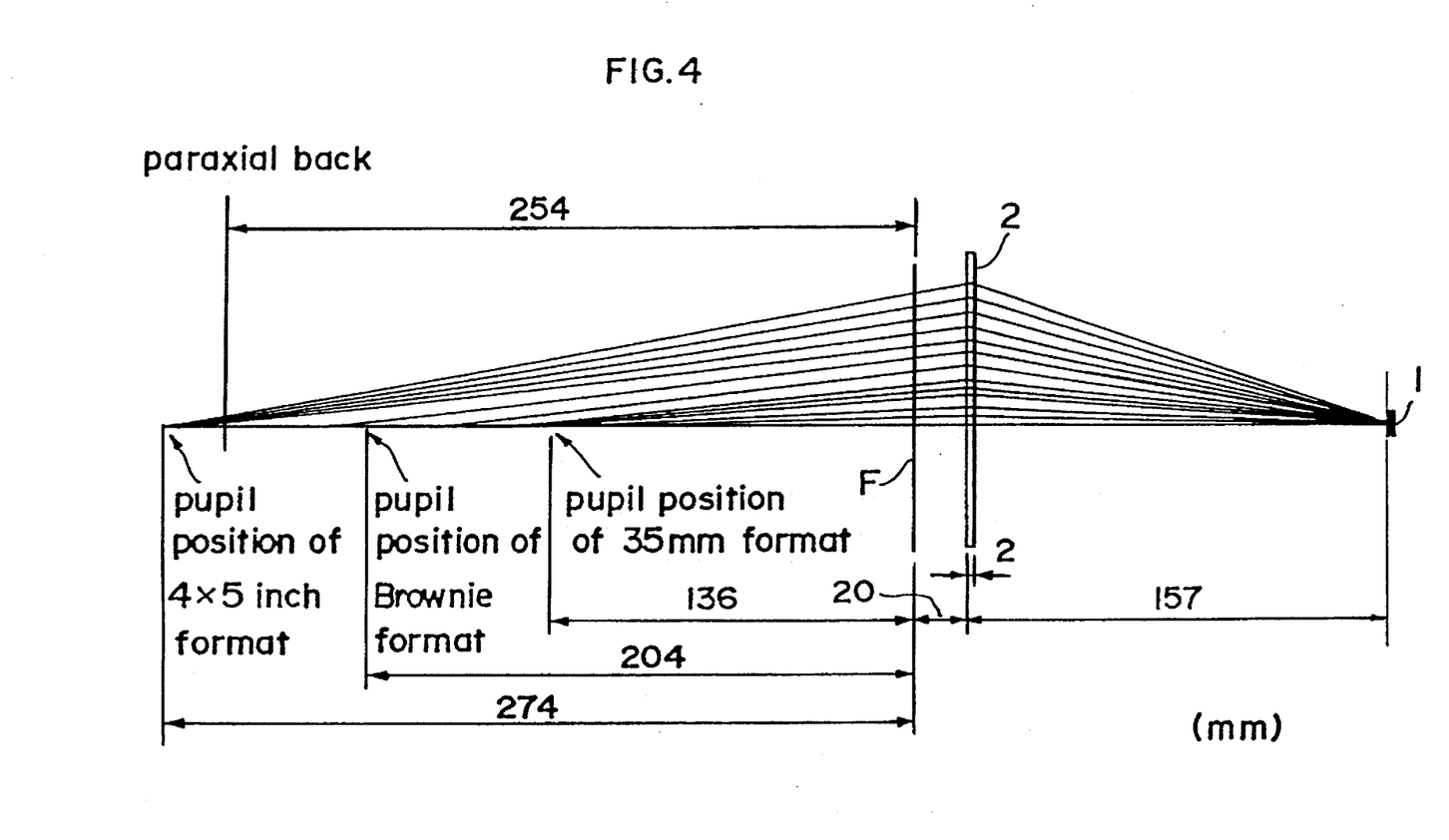
FIG. 4 is a chart showing the convergence state of the light rays of the Fresnel lens.

The expansion of h can be defined as the following:
$r(h) = a_0 + a_1 h + a_2 h^2 + a_3 h^3 + a_4 h^4$
A specific numerical example follows.
$a_o = 49.140$
$a_1 = 2.035031$
$a_2 = 0.1501799$
$a_3 = -0.3069829 \times 10^{-2}$
$a_4 = 0.2179239 \times 10^{-4}$
$n = 1.4914$ (acrylic: PMMA)
$f = 100$ mm
n: refractive index of the medium
f: focal length FIG. 4 is a chart showing the convergence state of the light rays in the linear Fresnel lens when the light source (filament 1) is the object point.

One surface of the previously mentioned convergence element 2 (exit surface of the linear Fresnel lens shown in FIG. 2) possesses light diffusion characteristics. It is possible that the convergence element 2 may also have the function of a condenser lens, making it very difficult to damage the film F when reading by the linear CCD 4.

When the projection magnification is changed, methods other than the previously described method of changing the distances PA, PB, and PC, may be used, such as a method wherein the conjugate distance from the film F to the linear CCD 4 is standardized, and a zoom lens is used as the projection lens and the focal length of said zoom lens is changed. Other types of lenses other than the aforesaid linear Fresnel lens may be used as the convergence element 2, particularly a Fresnel lens having a sawtooth formation in cross section to converge lattice-like concentric circle patterns. If a linear Fresnel lens is used which is powered in only the main scanning direction X, positioning of the lens in the subscanning direction Y is readily accomplished.

Figure 5A:
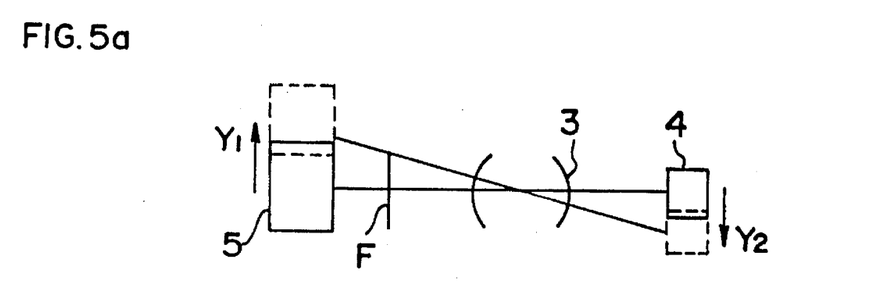
FIG. 5a is an illustration of image scanning in the first embodiment.
Figure 5B:
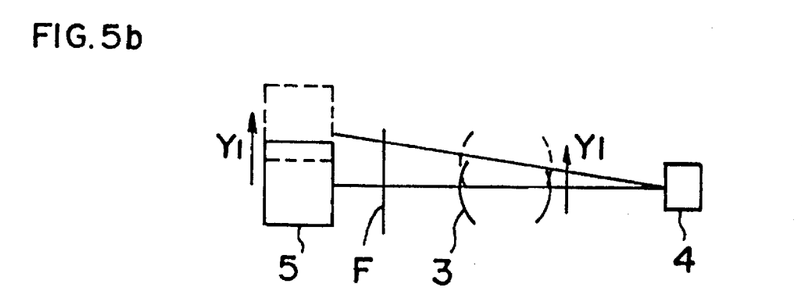
FIG. 5b is an illustration of image scanning in a first embodiment.

On the other hand, when scanning a film image in the subscanning direction Y, the illumination unit 5 (includes the aforesaid filament 1 and convergence element 2) and the linear CCD 4 may be moved synchronously in opposite directions Y1 and Y2, as shown in FIG. 5a, or the illumination unit 5 and the projection lens 3 may be moved synchronously in the same direction Y1, as shown in FIG. 5b. In both the aforesaid scanning methods, only components within the apparatus are moved, without an operator manually handling the apparatus for a film F operation or the like, thereby assuring complete safety of an operator.

Figure 6:
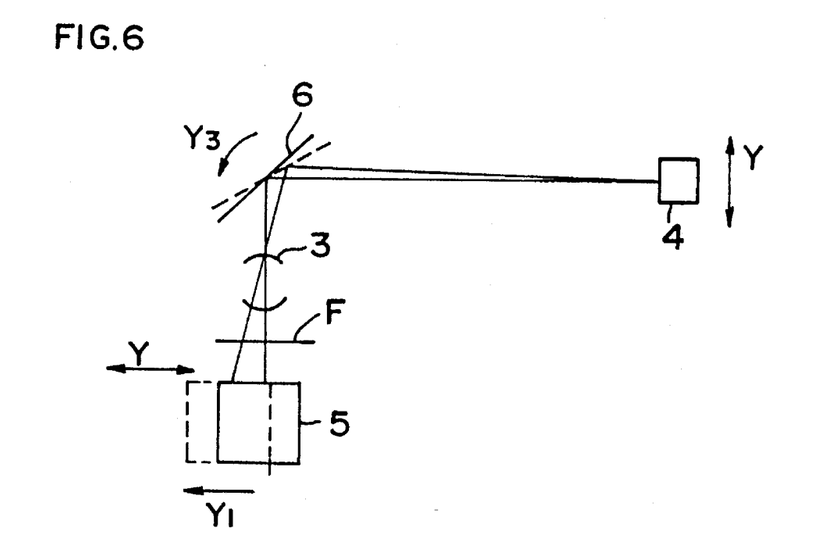
FIG. 6 is an elevation view briefly showing the image reading apparatus of a second embodiment.

FIG. 6 is an elevation view briefly showing the construction of a second embodiment. The light flux emitted from the projection lens 3 is bent 90° by the plane mirror 6 so as to form an image on the linear CCD 4. According to the present construction, scanning of a film image in the subscanning direction Y is accomplished by moving the illumination unit 5 in the direction Y1, while synchronously moving the plane mirror 6 in the arrow direction Y3 at the same time.

Figure 7:
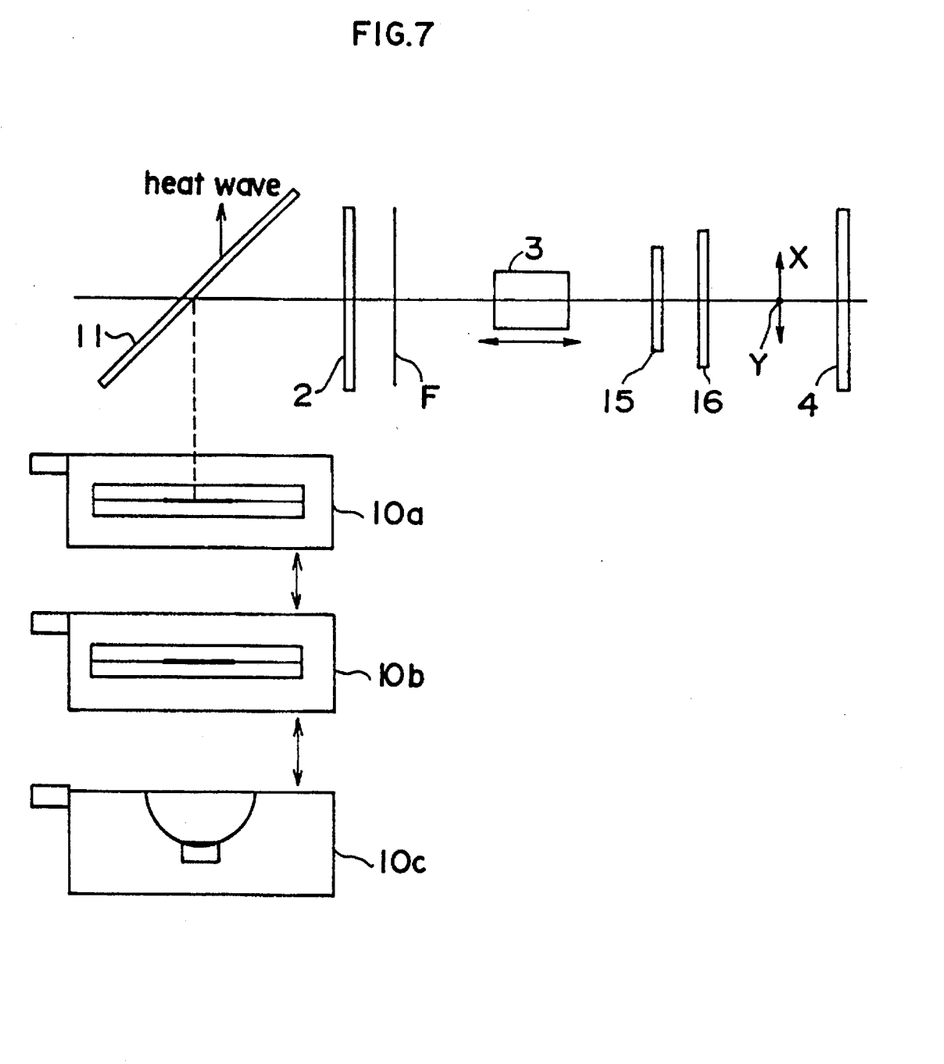
FIG. 7 is an elevation view briefly showing the image reading apparatus of a third embodiment.

FIG. 7 is an elevation view briefly showing the construction of a third embodiment. The lamp units 10a, 10b, and 10c are exchangeable in accordance with the size of the film F; lamp unit 10a corresponding to a 4×5 inch format, lamp unit 10b corresponding to a Brownie format, and unit 10c corresponding to a 35 mm format. The light flux emitted from each of the lamp units 10a, 10b, and 10c is bent 90° by heat-dissipating mirror 11, and is converged on the pupil of the projection lens 3 via the convergence element 2. The film F is disposed between the convergence element 2 and the projection lens 3. A replaceable filter 15 and infrared (IR) filter 16 are interposed between the projection lens 3 and the linear CCD 4. The replaceable filter 15 may be used for shading, negative film, positive film, Brownie format, 35 mm format which are installed beforehand so as to be retractable relative to the optical path, and so as to allow an optimum filter among said filters to be selectively inserted into the optical path in accordance with the type of film F.

In the third embodiment, the lamp units 10a, 10b, and 10c are exchanged in accordance with the size of the film F, and the projection lens 3 is moved on the optical axis to change the projection magnification to the linear CCD 4 so as to have the image received by all the image elements of the linear CCD 4 regardless of the film size. Scanning of the film image in the subscanning direction Y is accomplished by integratedly moving the illumination unit including the lamp units 10a, 10b, 10c, heat-dissipating mirror 11, and convergence element 2 in the subscanning direction Y. At the same time, the linear CCD 4 or projection lens 3 is moved synchronously with the illumination unit in the subscanning direction Y, as shown in FIG. 5b.

According to the third embodiment, if the lamp units 10a, 10b, 10c are exchanged in accordance with the film size, the absolute value of the incidence light entering the linear CCD 4 can be uniformly maintained regardless of changes in the projection magnification. Furthermore, the light balance in the main scanning direction X can be effectively equalized.

If a heat-dissipating mirror 11 is used as the optical path-bending mirror, the heat rays are transmitted through the mirror 11 and allowed to escape outside the optical system, such that only light rays are reflected by said mirror. The aforesaid arrangement prevents a temperature elevation of the convergence element 2 and the film F. The provision of a IR filter 16 directly anterior to the linear CCD 4 suppresses the infrared sensitivity of the CCD 4, such that only visible light is used to read the image.

The absolute amount of light entering the linear CCD 4 and the light balance in the main scan direction X can be regulated in accordance with the type of film F, and color balance can also be regulated by providing a replaceable filter 15 so as to be retractable relative to the optical path.

An optical system of compact construction is achieved by providing the aforesaid mirror 11 to bend the optical path. The effect of the aforesaid arrangement is similar to that described in the second embodiment shown in FIG. 6. In an optical system of the previously described type, adhesion of dust to the acting surfaces and the like can be prevented by arranging the convergence element 2 and the filter 15 and the like in a perpendicular direction, or disposing the photoreceptor surface of the CCD 4 and the reflecting surface of the mirror 11 in horizontal or downward directions.

Figure 8:
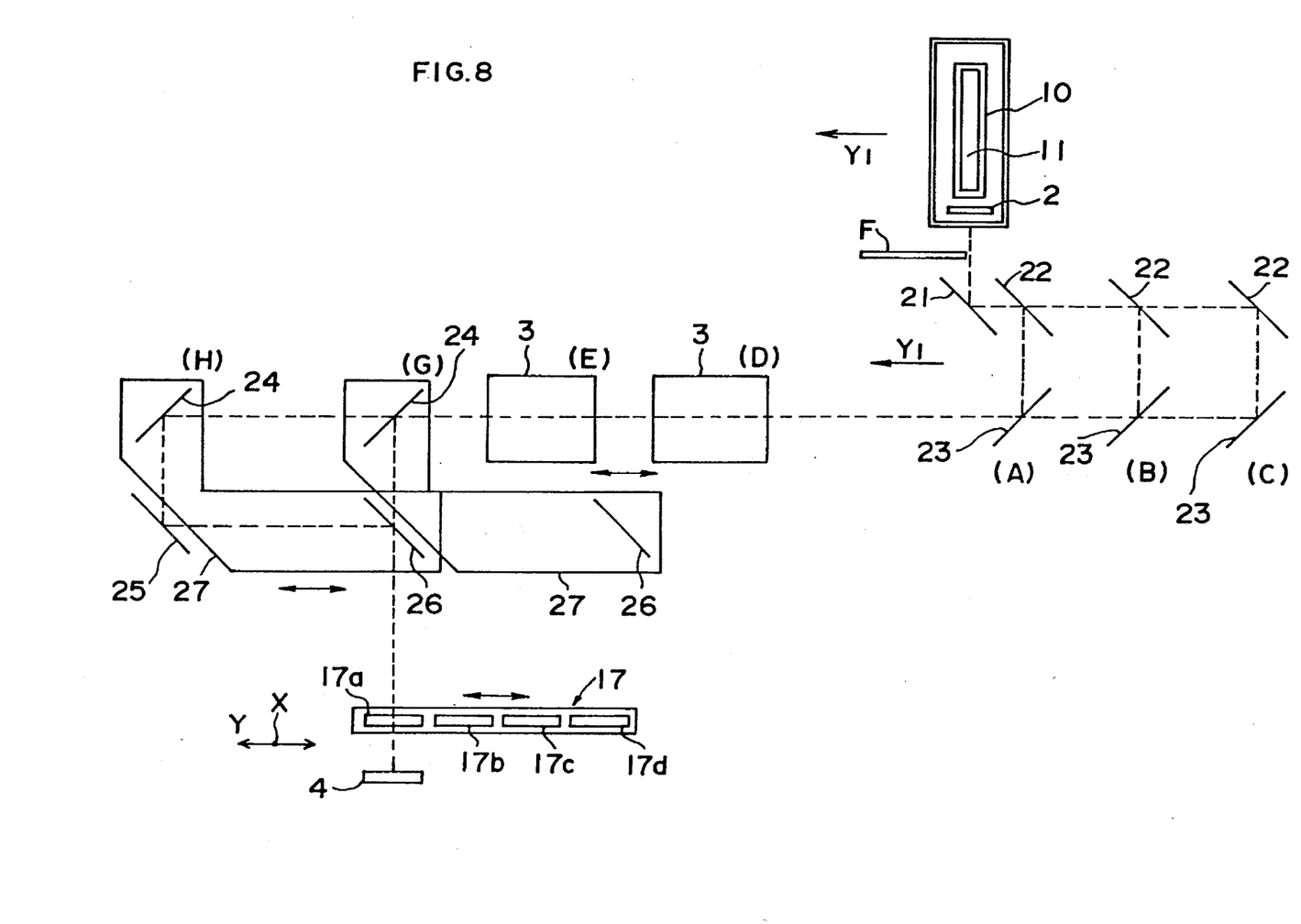
FIG. 8 is an elevation view briefly showing the image reading apparatus of a fourth embodiment.

FIG. 8 is an elevation view briefly showing the construction of a fourth embodiment. The optical path comprises a first mirror 21, second mirror 22, third mirror 23, fourth mirror 24, fifth mirror 25, and sixth mirror 26, and a projection lens 3 is interposed between said third mirror 23 and said fourth mirror 24. The illumination unit comprises a lamp unit 10 below a heat-dissipating unit 11. Light flux is bent in a horizontal direction by the heat-dissipating mirror 11, and attains the first mirror 21 passing through the convergence element 2 and the film F. The light flux is reflected by the first mirror 21 and the second mirror 22, converges at the pupil of the projection lens 3, and subsequently is reflected by the fourth mirror 24 and the fifth mirror 25 or sixth mirror 26 in accordance with the type of film F, so as to impinge the linear CCD 4 via the filter 17.

During the image reading operation, the first mirror 21 and the illumination system including the lamp unit 10 are moved at uniform speed V in the arrow Y1 direction, while at the same time the second mirror 22 and the third mirror 23 are integratedly moved as a unit at a speed of V/2 in the arrow Y1 direction so as to scan the image in the subscanning direction Y. The second mirror 22 and the third mirror 23 have different scan starting positions depending on the size of the film F. In the case of 35 mm film format, the starting position is position A, in the case of Brownie format the starting position is position B, in the case of 4×5 inch format the starting position is position C, whereas all moved in the arrow Y1 direction. The projection magnification is changed by changing the position of the projection lens 3 on the optical axis in accordance with the size of the film F. The projection lens 3 is positioned at position D for 35 mm and Brownie formats, and at position E for 4×5 inch format. The fourth mirror 24, fifth mirror 25 and sixth mirror 26 are mounted on a holder 27, which is set at position G for Brownie and 4×5 inch formats, such that the light flux reflected by the fourth mirror 24 passes directly through the filter 17 and impinges the linear CCD 4. On the other hand, the holder 27 is positioned at position H for 35 mm format, and the light flux reflected by the fourth mirror 24 is further reflected by the fifth mirror 25, and sixth mirror 26, passes through the filter 17 and impinges the linear CCD 4.

The fourth embodiment of the invention is capable of full-color image reading. The filter 17 may be a monochrome image filter 17a, or filter 17b, 17c, 17d for the three primary colors of red, green, blue, respectively, and any of the above filter may be selectively and automatically retractable from the optical path. In accordance with the color, the linear CCD 4 can convert the signal of the read color into image signals corresponding to the four colors of cyan (C), magenta (M), yellow (Y), and black (Bk) via an image processing section not shown in the illustrations. Such an image processing section is well known.

According to the fourth embodiment, the illumination system and mirrors 21, 22, and 23 are moved at uniform in the subscanning direction Y to scan the image, thereby rendering shading correction readily attainable.

In the previously described embodiments, the pupil of the projection means is moved on the optical path to change the projection magnification whenever the film size is changed. By changing the projection magnification as described, resolution is improved by using the effectiveness of all image elements of the image reading means, while eliminating a lens replacement means. At this time, in the case of a single focus lens as the projection means, the pupil is moved in accordance with the lens movement. In the case of a zoom lens, the pupil is moved in accordance with the movement of the lens itself when the lens group distances are changed. However, since at least the illumination system is provided with a convergence element powered in the main scanning direction, said convergence element may converge the light from a light source at said pupil regardless of the movement of said pupil. Thus, uniform light balance is maintained in the main scanning direction regardless of changes in the projection magnification.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading apparatus comprising:

image reading means having a plurality of reading elements arrayed in a main scanning direction;

illumination means including a light source and condenser elements having power in the main scanning direction;

projections means, having a pupil, for projecting an image of an original illuminated by said illumination means on said image reading means;

drive means for moving said projection means on an optical axis of the projection means; and scan means for scanning the image of the original in a subscanning direction which is perpendicular to the main scanning direction with the original fixed at a predetermined position, wherein the scan means moves said image reading means in the subscanning direction.

2. An image reading apparatus as claimed in claim 1, wherein the scan means moves said illumination means in the subscanning direction synchronized with the movement of the image reading means.

3. An image reading apparatus as claimed in claim 1, wherein the condenser elements include a linear Fresnel lens which is powered in only the main scanning direction.

4. An image reading apparatus as claimed in claim 1, wherein the condenser elements have power characteristics such that the point of convergence recedes in accordance with the separation of the light rays from the optical axis.

5. An image reading apparatus as claimed in claim 1, wherein the condenser elements includes a linear Fresnel lens which is powered in only the main scanning direction.

6. An image reading apparatus as claimed in claim 5, wherein the linear Fresnel lens is a cylindrical lens made of resin with a reduced thickness.

7. An image reading apparatus as claimed in claim 5, wherein the light source has a predetermined length along the main scanning direction.

8. An image reading apparatus as claimed in claim 1, wherein the condenser elements include a Fresnel lens having a sawtooth formation in cross section to converge lattice-like concentric circle patterns.

9. An image reading apparatus as claimed in claim 1, further comprising:

mirror disposed between the image reading device and the light source for bending the optical path.

10. An image reading apparatus as claimed in claim 9, wherein the mirror transmits heat rays.

11. An illumination system for use in an image reading apparatus, the illumination system illuminating an original which retains an image to be read, the image reading apparatus having a projection lens unit to project the image of said original onto an image reading device with a different magnification based on movement of the projection lens unit along an optical axis, the illumination system comprising:

a light source; and condenser elements having an aspherical effect in the main scanning direction, thereby satisfying the requirements for Köhler illumination, wherein the light source is exchangeable based on the position of the projection lens unit along an optical axis.

12. An illumination system as claimed in claim 11, wherein the condenser elements have power characteristics such that the point of convergence recedes in accordance with the separation of the light rays from the optical axis.

13. An illumination system as claimed in claim 11, wherein the condenser elements include a linear Fresnel lens which is a cylindrical lens made of resin with a reduced thickness.

14. An illumination system as claimed in claim 11, wherein the condenser elements include a Fresnel lens having a sawtooth formation in cross section to converge lattice-like concentric circle patterns.

15. An illumination system as claimed in claim 11 further including a first light source corresponding to a 4×5 inch original, a second light source corresponding to a Brownie original format, and a third light source corresponding to a 35 mm original format.

16. An image reading apparatus comprising:

image reading means having a plurality of reading elements arrayed in a main scanning direction;

illumination means including a light source and condenser elements having power in the main scanning direction;

projections means, having a pupil, for projecting an image of an original illuminated by said illumination means on said image reading means;

drive means for moving said projection means on an optical axis of said projection means; and scan means for scanning the image of the original in a subscanning direction which is perpendicular to the main scanning direction with the original fixed at a predetermined position, wherein the scan means moves said projection means in the subscanning direction.

17. An image reading apparatus as claimed in claim 16, wherein the scan means moves said illumination means in the subscanning direction synchronized with the movement of the projection means.

18. An image reading apparatus as claimed in claim 16, wherein the condenser elements include a linear Fresnel lens which is powered in only the main scanning direction.

19. An image reading apparatus as claimed in claim 16, wherein the condenser elements have power characteristics such that the point of convergence recedes in accordance with the separation of the light rays from the optical axis.

20. An image reading apparatus which reads an image of an original, comprising:

an image reading device;

an illumination system which is fixedly provided relative to an optical axis thereof, and which illuminates the original; and a projection lens unit which projects the image of the original illuminated by said illumination system onto said image reading device, and which is arranged to be movable along an optical axis thereof so as to change a magnification of projection between an enlargement side and a reduction side, said illumination system including a light source and condenser elements which have an aspherical effect, thereby satisfying the requirements for Köhler illumination.

21. An illumination system as claimed in claim 20, wherein the condenser elements have power characteristics such that the point of convergence recedes in accordance with the separation of the light rays from the optical axis.

22. An illumination system as claimed in claim 20, wherein the condenser elements include a linear Fresnel lens which is a cylindrical lens made of resin with a reduced thickness.

23. An illumination system as claimed in claim 20, wherein the condenser elements include a Fresnel lens having a sawtooth formation in cross-section to converge lattice-like concentric circle patterns.

* * * * *